(12) United States Patent
Christiansen

(10) Patent No.: US 6,592,244 B2
(45) Date of Patent: Jul. 15, 2003

(54) ADJUSTABLE SUPPORT ELEMENT FOR A VEHICLE HEADLIGHT

(75) Inventor: Thomas Christiansen, Flacht (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/023,703

(22) Filed: Dec. 21, 2001

(65) Prior Publication Data

US 2002/0080620 A1 Jun. 27, 2002

(30) Foreign Application Priority Data

Dec. 21, 2000 (DE) ........................................ 100 63 880

(51) Int. Cl.7 ................................................ F21Y 21/14
(52) U.S. Cl. ...................... 362/528; 362/421; 248/635; 411/60.2; 411/72
(58) Field of Search ................................ 362/528, 421; 248/635; 411/60.2, 72

(56) References Cited

U.S. PATENT DOCUMENTS

| | | | | |
|---|---|---|---|---|
| 2,301,244 A | * | 11/1942 | Bishop ....................... | 411/80.2 |
| 3,449,799 A | * | 6/1969 | Bien .......................... | 411/548 |
| 3,579,942 A | * | 5/1971 | Cole .......................... | 411/80.6 |
| 4,188,655 A | * | 2/1980 | Tallon et al. ............... | 362/421 |
| 4,263,833 A | * | 4/1981 | Loudin et al. .............. | 411/80.1 |
| 4,503,486 A | * | 3/1985 | Makita ....................... | 362/419 |
| 5,743,618 A | * | 4/1998 | Fujino et al. ............... | 362/528 |
| 6,213,700 B1 | * | 4/2001 | Everard ...................... | 411/60.2 |

FOREIGN PATENT DOCUMENTS

| | | |
|---|---|---|
| DE | 2024171 | 12/1971 |
| DE | 3102685 | 9/1982 |
| DE | 3208804 C2 | 1/1989 |
| DE | 3825177 A1 | 12/1989 |
| EP | 0088931 | 9/1983 |
| FR | 2606341 | 5/1988 |

OTHER PUBLICATIONS

J. Beuel and K. Rhein, "Leuchte für den Anbau an verschieden schräge Flächen", Dec. 27, 1962, pp. 1–4.

* cited by examiner

Primary Examiner—Sandra O'Shea
Assistant Examiner—Ismael Negron
(74) Attorney, Agent, or Firm—Crowell & Moring LLP

(57) ABSTRACT

An adjusting element for fastening a headlight arrangement on a vehicle. The adjusting element has a nut element and a screw element, the screw element being screwed into the nut element. An opening is formed at a vehicle-body-side supporting plate for the nut element. The nut element is formed by an expansion nut which can be inserted into the opening, can be adjusted and has an eccentrically constructed receiving groove, so that, in the insertion direction and transversely thereto, the opening has a larger measurement than the inside diameter of the receiving groove and that, as a result of the screwing of the screw element into the positioned expansion nut, the latter is fixed on the supporting plate.

24 Claims, 2 Drawing Sheets

ADJUSTABLE SUPPORT ELEMENT FOR A VEHICLE HEADLIGHT

BACKGROUND AND SUMMARY OF THE INVENTION

This application claims the priority of German application 100 63 880.5, filed Dec. 21, 2000, the disclosure of which is expressly incorporated by reference herein.

The invention relates to an adjusting element for fastening a headlight arrangement on a vehicle, the adjusting element comprising a nut element and a screw element, the screw element being screwed into the nut element, and an opening being formed at a vehicle-body-side supporting plate.

From French Patent Document FR 2 606 341 A1, an adjusting element is known for fastening a headlight arrangement on a vehicle, which adjusting element is composed of a nut element and of a screw element. At its one end region, the screw element is connected with the headlight arrangement, whereas the other end region of the screw element extends through a circular opening of a vehicle-body-side supporting plate, and the nut element is screwed onto the projecting thread region. This type of plug-in element permits an adjustability in only one direction, specifically in the longitudinal direction.

It is an object of the invention to further develop an adjusting element for fastening a headlight arrangement on a vehicle such that a three-dimensional adjustability is achieved for the headlight arrangement.

According to the invention, this object is achieved by providing an adjusting element for fastening a headlight arrangement on a vehicle, the adjusting element comprising a nut element and a screw element, the screw element being screwed into the nut element, and an opening being formed at a vehicle-body-side supporting plate, wherein the nut element is formed by an expansion nut which can be inserted into the opening, can be adjusted and has an eccentrically constructed receiving groove, wherein the opening has a larger measurement in an insertion direction and transversely thereto than an inside diameter of the receiving groove, and wherein the screw element expansion nut is fixed on the supporting plate as a result of the screwing of the screw element into the positioned expansion nut.

Important characteristics of the preferred embodiments of the adjusting element according to the invention are that, as a result of the expanding nut provided with an eccentrically constructed receiving groove and the forming of the opening, a plug-in element is provided by means of which a three-dimensional adjustability is achieved for the headlight arrangement. The expanding nut with a clamping function and the eccentrically constructed receiving groove can be inserted in a simple manner into the opening of the vehicle-body-side supporting plate and is positioned by means of a fixing device. The over-dimensioned hole ensures a free adjustability in a plane (here: Y-Z). As a result of screwing in the screw element, which contains the connection to the headlight arrangement, the expanding nut is clamped to the supporting plate. The adjusting element is fixed in the Y-Z plane. The third adjustment—normal with respect to the clamping surface—is represented by the reach of the screw of the screw element. On the basis of the moment of friction occurring during the screwing-in between the expanding nut and the screw element, the eccentric receiving groove of the expanding nut is placed against the lower edge of the overdimensioned hole. As a result, a supporting takes place in the Z-direction in addition to the clamping connection.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
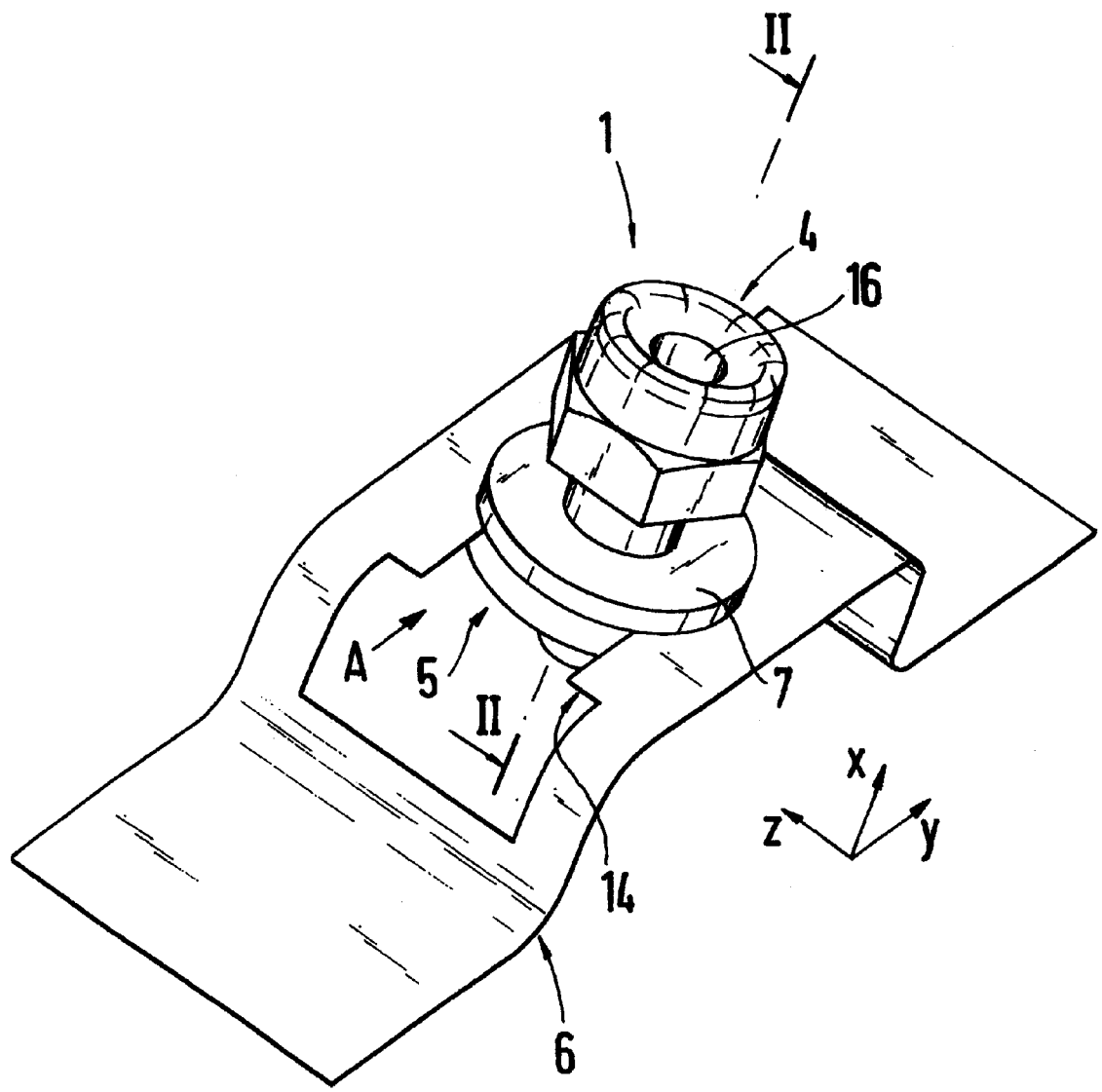
FIG. 1 is a perspective view of an adjusting element for fastening a headlight arrangement, constructed according to a preferred embodiment of the invention.
Figure 2:
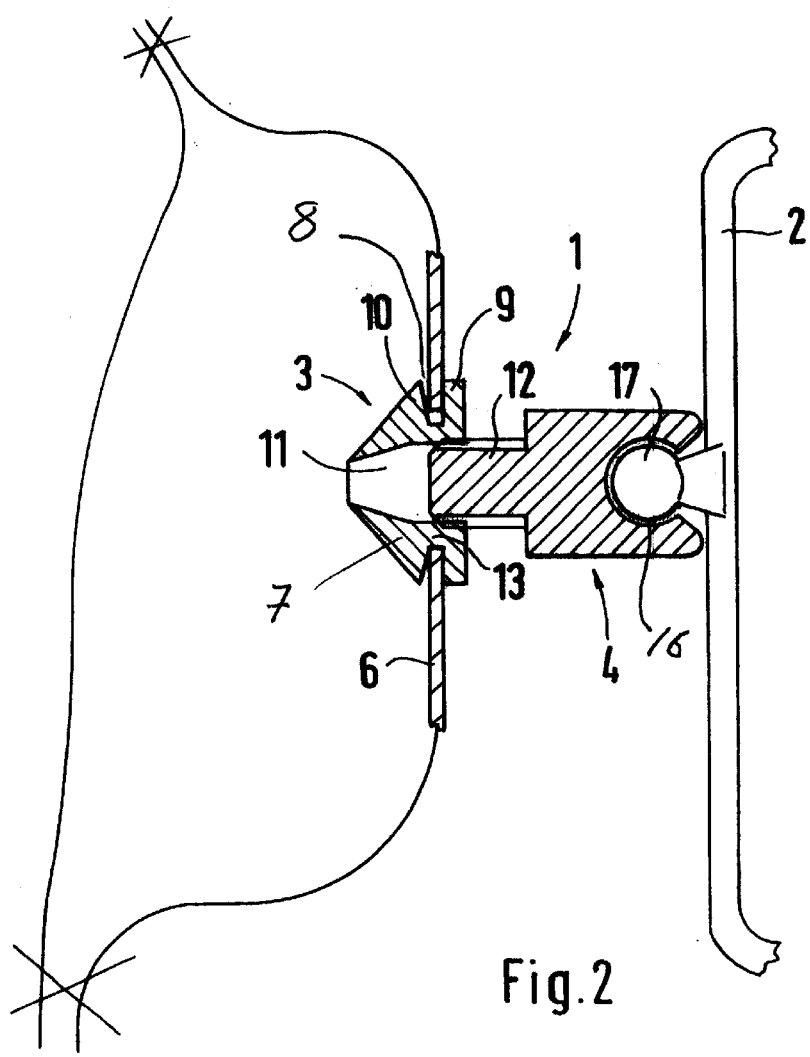
FIG. 2 is a sectional view taken along section line II—II of FIG. 1.
Figure 3:
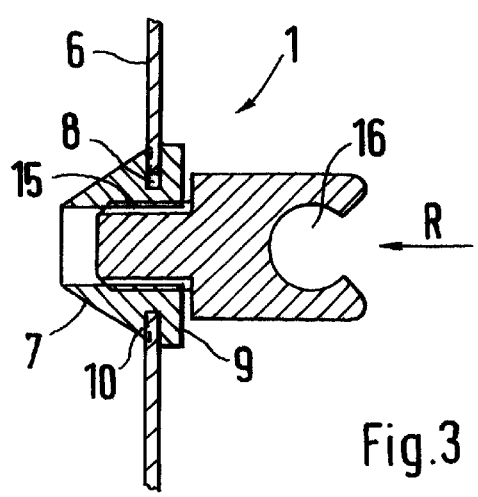
FIG. 3 is a sectional view corresponding to FIG. 2, in which the clamping condition of the adjusting element is illustrated.
Figure 4:
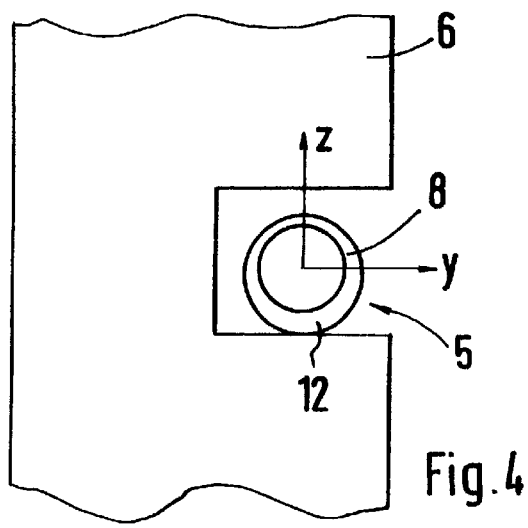
FIG. 4 is a view in the direction of the arrow R of FIG. 3.

An adjusting element 1 for fastening a headlight arrangement 2 on a vehicle comprises a nut element 3 and a screw element 4. The nut element 3 is formed by an expanding nut 7 which can be inserted into an opening 5 of a vehicle-body-side supporting plate 6 and can be adjusted. The expanding nut 7 is provided with an eccentrically constructed receiving groove 8 which is bounded by an upper collar section 9 and a lower lip section 10.

The collar section 9 and the lip section 10 rest on opposite sides of the supporting plate 6. The expanding nut 7 has a center receiving device 11 for receiving a screw portion 12 of the screw element 4. Because of the eccentrically constructed receiving groove 8, a web 13 extending between the receiving device 11 and the base of the receiving groove 8 has a varying wall thickness.

The opening 5 on the supporting plate 6 is formed by an oblong slot opening which is open on one side and which has a widening 14 in the introduction area for the expanding nut 7. In the insertion direction A and transversely thereto, the opening has a larger measurement than the inside diameter of the receiving groove 8 (overdimensioned hole), so that an adjustability between the expansion nut 7 and the opening 5 is achieved by rotating the expansion nut 7.

The screw element 4 has a screw portion 12 with an external thread 15 which can be screwed into the expansion nut 7 and, opposite this screw portion 12, has a receiving device 16 for a ball element 17 of the headlight arrangement 2. When the screw portion 12 is screwed into the expansion nut 7, the expansion nut 7 expands and clamps onto the supporting plate 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Adjusting element for fastening a headlight arrangement on a vehicle, the adjusting element comprising a nut element and a screw element, the screw element being screwed into the nut element, and an opening being formed at a vehicle-body-side supporting plate, wherein the nut element is formed by an expansion nut which can be inserted into the opening, can be adjusted and has an eccentrically constructed receiving groove, wherein the opening has a larger measurement in an insertion direction and transversely thereto than an inside diameter of the receiving groove, and wherein the screw element and expansion nut see fixed on the supporting plate as a result of the screwing of the screw element and into the positioned expansion nut.

2. Adjusting element according to claim 1, wherein the screw element includes a screw portion which can be screwed into the expansion nut and a receiving device opposite this screw portion for a ball element of the headlight arrangement.

3. Adjusting element according to claim 1, wherein the opening is formed at the supporting plate by an oblong slot opening which is open on one side and which has a widening in an introduction area.

4. Adjusting element according to claim 3, wherein the screw element includes a screw portion which can be screwed into the expansion nut and a receiving device opposite this screw portion for a ball element of the headlight arrangement.

5. Adjusting element according to claim 3, wherein an adjustability is permitted in two axes as a result of the rotation of the expansion nut about the eccentric receiving groove.

6. Adjusting element according to claim 5, wherein adjustability in a third plane takes place by a varying reach of the screw element in the expansion nut.

7. Adjusting element according to claim 1, wherein an adjustability is permitted in two axes as a result of the rotation of the expansion nut about the eccentric receiving groove.

8. Adjusting element according to claim 7, wherein the screw element includes a screw portion which can be screwed into the expansion nut and a receiving device opposite this screw portion for a ball element of the headlight arrangement.

9. Adjusting element according to claim 7, wherein adjustability in a third axis takes place by a varying reach of the screw element in the expansion nut.

10. Adjusting element according to claim 9, wherein the screw element includes a screw portion which can be screwed into the expansion nut and a receiving device opposite this screw portion for a ball element of the headlight arrangement.

11. Adjusting element according to claim 1, wherein the receiving groove is bounded by an upper collar section and a lower lip section, and wherein the collar section and the lip section rest on opposite sides of the supporting plate.

12. Adjusting element according to claim 11, wherein the screw element includes a screw portion which can be screwed into the expansion nut and a receiving device opposite this screw portion for a ball element of the headlight arrangement.

13. Adjusting element according to claim 11, wherein an adjustability is permitted in two axes as a result of the rotation of the expansion nut about the eccentric receiving groove.

14. Adjusting element according to claim 13, wherein adjustability in a third plane takes place by a varying reach of the screw element in the expansion nut.

15. Adjusting element according to claim 14, wherein the screw element includes a screw portion which can be screwed into the expansion nut and a receiving device opposite this screw portion for a ball element of the headlight arrangement.

16. A vehicle headlight fastening assembly comprising:

a vehicle body side supporting plate with an opening, an expansion nut insertable into the opening, said nut having an eccentric receiving groove engageable in use with the supporting plate, and a screw element threadably engageable with the expansion nut to clamp the expansion nut on the supporting plate, wherein the opening is configured to be larger than an inside diameter of the receiving groove to accommodate insertion of the expansion nut in a lateral direction with portions of said receiving plate bounded on opposite sides by the receiving groove.

17. A vehicle headlight fastening assembly according to claim 16, wherein the screw element has a receiving device for a ball element of a headlight support arrangement.

18. A vehicle headlight fastening assembly according to claim 16, wherein the receiving groove is bounded by an upper collar section and a lower lip section, and wherein the collar section and the lip section rest on opposite sides of the supporting plate.

19. A vehicle headlight fastening assembly according to claim 18, wherein an adjustability is permitted in two axes as a result of the rotation of the expansion nut about the eccentric receiving groove.

20. A vehicle headlight fastening assembly according to claim 19, wherein adjustability in a third axes takes place by a varying reach of the screw element in the expansion nut.

21. A vehicle headlight fastening assembly according to claim 16, wherein the opening is formed at the supporting plate by an oblong slot opening which is open on one side and which has a widening in an introduction area.

22. A vehicle headlight fastening assembly according to claim 21, wherein the receiving groove is bounded by an upper collar section and a lower lip section, and wherein the collar section and the lip section rest on opposite sides of the supporting plate.

23. A vehicle headlight fastening assembly according to claim 22, wherein an adjustability is permitted in two axes as a result of the rotation of the expansion nut about the eccentric receiving groove.

24. A vehicle headlight fastening assembly according to claim 23, wherein adjustability in a third axis takes place by a varying reach of the screw element in the expansion nut.

* * * * *